US011875033B1

(12) United States Patent
Kokins

(10) Patent No.: US 11,875,033 B1
(45) Date of Patent: Jan. 16, 2024

(54) TOUCH-BASED OCCLUSION FOR HANDHELD DEVICES

(71) Applicant: Bidstack Group PLC, London (GB)

(72) Inventor: Arvids Kokins, London (GB)

(73) Assignee: Bidstack Group PLC, London (GB)

(*) Notice: Subject to any disclaimer, the term of this patent is extended or adjusted under 35 U.S.C. 154(b) by 0 days.

(21) Appl. No.: 18/073,319

(22) Filed: Dec. 1, 2022

(51) Int. Cl.
*G06F 3/04883* (2022.01)
*G06F 11/34* (2006.01)
*G06F 3/04845* (2022.01)

(52) U.S. Cl.
CPC ...... *G06F 3/04883* (2013.01); *G06F 3/04845* (2013.01); *G06F 11/3438* (2013.01); *G06F 2203/04806* (2013.01)

(58) Field of Classification Search
CPC ............ G06F 3/04883; G06F 3/04845; G06F 11/3438; G06F 2203/04806
USPC .................................................. 715/700–866
See application file for complete search history.

(56) References Cited

U.S. PATENT DOCUMENTS

| 10,033,978 | B1* | 7/2018 | Bostick | H04N 9/3176 |
| 2011/0157025 | A1* | 6/2011 | Hoover | G06F 3/04883 |
| | | | | 345/173 |
| 2014/0282269 | A1* | 9/2014 | Strutt | G06F 3/04886 |
| | | | | 715/863 |
| 2016/0098125 | A1* | 4/2016 | Smus | G06F 3/0416 |
| | | | | 345/174 |
| 2018/0088786 | A1* | 3/2018 | Abzarian | G06F 3/04186 |
| 2018/0181294 | A1* | 6/2018 | Dare | G06F 3/04883 |
| 2020/0111394 | A1* | 4/2020 | Rakshit | G09G 5/12 |

* cited by examiner

*Primary Examiner* — Daniel Samwel
(74) *Attorney, Agent, or Firm* — EIP US LLP

(57) ABSTRACT

A method for determining a proportion of an area in a computer-generated scene that is visible to a user on a display of a handheld device configured to receive touch-based inputs. A location of the area in the computer-generated scene visible on the display of the handheld device is determined, and a touch-based input to the display of the handheld device is detected. A representation of the one touch-based input detected by the handheld device is generated and an intersection between the representation of the location of the touch-based input on the display of the handheld device, and a representation of the area at the location is determined. The intersection indicates the proportion of the area not visible to the user of the handheld device. An indication representative of the intersection is then transmitted to a remote server.

20 Claims, 4 Drawing Sheets

TOUCH-BASED OCCLUSION FOR HANDHELD DEVICES

BACKGROUND OF THE INVENTION

Field of the Invention

The present invention relates to methods, systems, and computer-readable storage storing instructions for determining a proportion of an area in a computer-generated scene that is visible to a user on a display. The invention has particular, but not exclusive, relevance to determining a portion of at least one area in a computer-generated scene that is visible on a handheld device's display.

Description of the Related Technology

Smartphones and other handheld devices are capable of running software of many types. Developers of the software have made money through the sale of the software, which may be downloaded directly to the handheld devices. These days handheld devices often have a direct connection to the Internet. As such, it is common for other revenue streams to be pursued based on the sale of advertising space, including advertising space within the software itself. In some examples, as part of the software program, it is desirable to determine which display areas are visible to the users. This is particularly important when the software program receives inputs via the touchscreen display of the handheld device.

SUMMARY

In accordance with a first aspect, there is provided a method for determining a proportion of at least one area in a computer-generated scene that is visible to a user on a display of a handheld device, the handheld device being configured to receive touch-based inputs, method comprising determining, by the handheld device, an area location representative of a position of the at least one area in the computer-generated scene visible on the display of the handheld device; detecting, by the handheld device, at least one touch-based input to the display of the handheld device; generating, by the handheld device, a representation of the at least one touch-based input detected by the handheld device; determining, by the handheld device, an intersection between the representation of the at least one touch-based input on the display of the handheld device, and a representation of the at least one area at the area location, wherein the intersection indicates the proportion of the at least one area not visible to the user of the handheld device; and transmitting from the handheld device, to a remote server, an indication representative of the intersection. This enables the tracking of touch-based inputs, and corresponding areas of a handheld device display, and determining areas on the display visible to a user accurately based on the extent to which the area is visible and not obscured by the touch of the user. By determining the extent to which the area is visible, accurate and reliable tracking of whether the area has been viewed by the user is possible with minimal additional processing since touch-based inputs are already analysed to determine where on the display the touch has occurred. Furthermore, providing this indication to a remote server enables accurate tracking of whether the area has been viewed, or the extent to which it has been viewed, such that further processing can be undertaken based on the indication, whilst minimising resource consumption on the handheld device.

Optionally, the method comprises generating, by the handheld device, at least one polygon indicative of the representation of the at least one touch-based input; determining, by the handheld device, a difference between the at least one polygon and a polygon indicative of the representation of the area rendered at the given area location; wherein the determined difference indicates the proportion of the area visible to the user of the handheld device. This enables the efficient generation of polygons and the determination of the difference using minimal processing power and device resources, whilst still providing an accurate indication of the extent.

Preferably, generating the at least one polygon indicative of the representation of the at least one touch-based input comprises applying at least a marching squares algorithm to the representation of the touch-based input. This is an efficient method of determining the overlap between the polygons, since it facilitates the use of parallel processing, thereby increasing efficiency and reducing computational overheads.

The at least one polygon indicative of the representation of the at least one touch-based input may be augmented by modifying at least one of a size or a position of the at least one polygon, the modification may be based on the at least one touch-based input on the display of the handheld device. By modifying the touch-based input polygon based on the representation of the touch-based input on the display, characteristics of the touch-based input, such as its location, can be used when determining whether other portions of the area are viewable by the user. By augmenting the polygon in such a way, a more accurate representation of the visible areas of the display can be obtained thereby resulting in a more accurate indication of whether the impression content was viewed, or the extent of it that has been viewed.

Optionally, the step of determining the intersection between the representation of the at least one touch-based input on the display of the handheld device, and the representation of the at least one area at the area location comprises generating a given number of points distributed substantially evenly across the representation of the at least one area; determining whether one or more of the given number of points is occluded by the representation of the at least one touch-based input; and calculating the proportion of the area that is visible to the user based on a ratio of un-occluded points and the given number of points. This is a quick and efficient way of determining an intersection by generating points and determining whether the points are within a given region of the display of the handheld device. This requires minimal processing power and resources and provides an accurate indication of the extent of the impression content that is visible.

The representation of the at least one touch-based input may be augmented based on a plurality of touch points associated with the representation of the at least one touch-based input. By augmenting the representation based on a touch points, the characteristics of the touch-based input can be considered, such as the location of the touch input on the display of the handheld device, when determining whether other portions of the area are viewable by the user. By augmenting the representation in such a way, a more accurate representation of the visible areas of the display can be obtained resulting in a more accurate indication of whether the at least one area was viewed by the user, since the augmented representation is based on an estimate of the occlusion created by the rest of the digit of the user's hand.

Augmenting the representation of the touch-based input may comprise determining one or more line segments associated with one or more points on the display of the handheld device and each of a plurality of test points, and determining an intersection between the one or more line segments and the representation of the location of the touch-based input. The line segments enable efficient intersection tests to be used when determining areas of the display of the handheld device obscured by the touch, or more specifically part of the user's hand. This enables a more accurate representation of the visible areas of the display of the handheld device to be obtained resulting in a more accurate indication of whether the area was viewed.

Optionally, the representation of the touch-based input comprises at least one of a sampled representation of a touch location based on sampling a grid of pressure intensity detection points associated with the display of the handheld device; and an area calculated based on a location of the at least one touch-based input detected by the handheld device. This enables different means of capturing touch-based inputs, depending on hardware access restrictions.

The method may further comprise augmenting the representation of the at least one touch-based input by applying a zoom blur to the sampled representation. This enables the received touch-based input to be captured and used to generate augmentation data indicative of the areas of the display visible to the user, that is an area not covered by the hand of the user. This results in a more accurate indication of the area of displayed content which is visible.

Optionally, the representation of the at least one touch-based input is augmented based on the at least one characteristic of the handheld device, where the at least one characteristic comprising at least sensor data associated with a sensor of the handheld device; data associated with at least one other touch-based input detected by the handheld device; a feature associated with the computer-generated scene being displayed on the display of the handheld device; and touch input calibration data. This enables additional inputs to be used when augmenting the touch-based input, such as a sensor associated with the handheld device, or the orientation of the computer-generated scene shown on the display of the handheld device. This provides additional data for augmenting the representations, thereby increasing the accuracy of the augmentation.

Augmenting the representation of the at least one touch-based input may comprise obtaining touch input calibration data from storage associated with the handheld device; analyzing the touch input calibration data to determine an augmentation area; and augmenting the representation of the at least one touch-based input based on the augmentation area. This enables the use of touch input calibration data to determine how to augment the representation. The touch-input calibration data may be trained machine learning data which has been trained using previous touch-based input data and video data of user interactions with the display. This enables more accurate representations to be generated, and by using previously trained machine learning data a reduction in resource usage, and an increase in accuracy and efficiency may be obtained The touch input calibration data may comprise a plurality of sampled representations representing a plurality of touch-based inputs by at least one previous user of a given handheld device, wherein the plurality of touch-based inputs are associated with a given location of a given touch-based input. By using sampled representations, touch information may be generated based on previously received touch-based inputs, thereby increasing the accuracy of the augmentation, and more efficiently determining whether the at least one area has been occluded.

The touch input calibration data may comprise touch-based input data based on interaction by at least one previous user with a given handheld device and associated frames of image data representing a viewpoint of the previous user. This enables external data, taken from a viewpoint of the user, to be used alongside the received touch-based inputs to improve the accuracy of the augmentation. This results in an improved representation being generated and therefore a more accurate indication as to whether the at least one area has been viewed.

Optionally, the touch input calibration data is determined using a machine learning algorithm arranged to receive at least a plurality of the touch-based input data. This enables the use of machine learning to generate the calibration data for use when augmenting the representation of the touch-based input. This results in an improved representation being generated, and therefore a more accurate indication as to whether the area has been viewed.

According to a second aspect, there is provided a handheld device comprising a display for displaying at least a computer-generated scene, and receiving at least one touch-based input; a determination module for determining an area location representative of a position of at least one area in the computer-generated scene visible on the display; a touch module for detecting at least one touch-based input; a generation module for generating at least a representation of the at least one touch-based input detected by the handheld device; an intersection determination module for determining an intersection between the representation of the at least one touch-based input on the display of the handheld device, and a representation of the at least one area at the area location, wherein the intersection indicates the proportion of the at least one area not visible to a user of the handheld device; and a transmission module for transmitting an indication representative of the intersection to a remote server. This enables the tracking of touch-based inputs, and corresponding areas of a handheld device display, and determining areas on the display visible to a user accurately based on the extent to which the area is visible and not obscured by the touch of the user. By determining the extent to which the area is visible, accurate and reliable tracking of whether the area has been viewed by the user is possible with minimal additional processing since touch-based inputs are already analysed to determine where on the display the touch has occurred. Furthermore, providing this indication to a remote server enables accurate tracking of whether the area has been viewed, or the extent to which it has been viewed, such that further processing can be undertaken based on the indication, whilst minimising resource consumption on the handheld device.

Optionally, the handheld device further comprises at least one sensor for capturing data associated with at least one environmental factor; a characteristic analysis module configured to generate characteristics associated with the computer-generated scene being displayed on the display of the handheld device; and storage configured to store at least touch input calibration data. This enables additional inputs to be used when augmenting the touch-based input, such as a sensor associated with the handheld device, or the orientation of the computer-generated scene shown on the display of the handheld device. This provides additional data for augmenting the representations, thereby increasing the accuracy of the augmentation.

The handheld device may further comprise an augmentation module configured to augment the representation of the at least one touch-based input. By augmenting the representation, a more accurate representation of the visible areas of the display can be obtained, resulting in a more accurate indication of whether the at least one area was viewed.

The augmentation module may be further configured to obtain touch input calibration data from storage associated with the handheld device; analyze the touch input calibration data to determine an augmentation area; and augment the representation of the touch-based input based on the augmentation area. This enables the use of touch input calibration data to determine how to augment the representation. The touch-input calibration data may be trained machine learning data which has been trained using previous touch-based input data and video data of user interactions with the display. This enables more accurate representations to be generated, and by using previously trained machine learning data a reduction in resource usage, and an increase in accuracy and efficiency may be obtained.

The augmentation module may comprise a machine-learning processor for generating augmentation data using a trained machine-learning algorithm arranged to receive at least a plurality of the touch-based input data. This enables the use of machine learning to generate the calibration data for use when augmenting the representation of the touch-based input. This results in an improved representation being generated and therefore a more accurate indication as to whether the area has been viewed.

According to a third aspect, there is provided a non-transitory computer-readable storage medium comprising a set of computer-readable instructions stored thereon which, when executed by at least one processor are arranged to determine a proportion of at least one area in a computer-generated scene that is visible to a user on a display of a handheld device configured to receive touch-based inputs, wherein the instructions, when executed cause the at least one processor to determine, an area location representative of a position of the area in the computer-generated scene visible on the display of the handheld device; detect at least one touch-based input to the display of the handheld device; generate a representation of the at least one touch-based input detected by the handheld device; determine an intersection between a representation of the touch-based input on the display of the handheld device, and a representation of the area at the area location, wherein the intersection indicates the proportion of the area not visible to the user of the handheld device; and transmitting from the handheld device, to a remote server, an indication representative of the intersection. This enables the tracking of touch-based inputs, and corresponding areas of a handheld device display, and determining areas on the display visible to a user accurately based on the extent to which the area is visible and not obscured by the touch of the user. By determining the extent to which the area is visible, accurate and reliable tracking of whether the area has been viewed by the user is possible with minimal additional processing since touch-based inputs are already analysed to determine where on the display the touch has occurred. Furthermore, providing this indication to a remote server enables accurate tracking of whether the area has been viewed, or the extent to which it has been viewed, such that further processing can be undertaken based on the indication, whilst minimising resource consumption on the handheld device.

DETAILED DESCRIPTION OF CERTAIN INVENTIVE EMBODIMENTS

Details of methods and systems according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Examples of the present disclosure relate to determining a proportion of at least one area in a computer-generated scene that is visible to a user on a display of a handheld device, such as a handheld device configured to receive touch-based user inputs. More specifically, embodiments described herein can determine the visible proportion of a portion of the screen based on obstacles associated with the touch-based user input.

Figure 1:
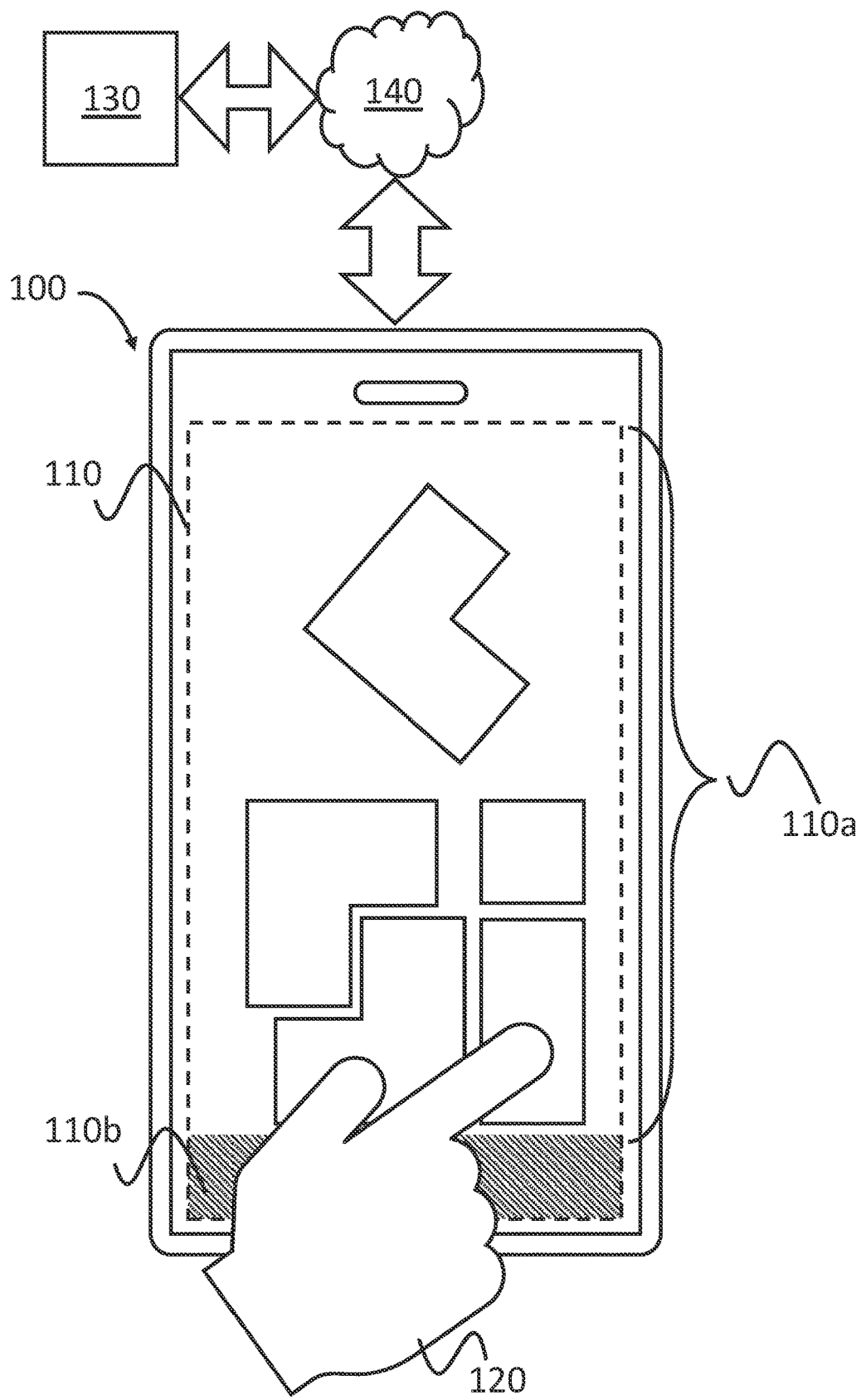
FIG. 1 is a schematic diagram of a handheld user device capable of determining an area in a computer-generated scene visible to a user on a display, according to an example.

FIG. 1 shows, schematically, a handheld device 100 according to a first example. The handheld device 100 shown is a mobile telephone with a touch screen interface; however, it will be appreciated that the handheld device 100 may be any type of handheld device, including a microprocessor-based system, a programmable consumer electronic device comprising appropriate transmitting and/or receiving, and user input capabilities. The handheld device 100 is configured to present content 110 for presentation to a user via a display associated with the handheld device 100. The content 110 may contain a number of areas 110*a*, 110*b* either or both of which may be generated on the handheld user device 100 and/or may be received from a remote server 130 responsible for generating the content 110. The handheld device 100 and the remote server 130 may be configured to communicate over a network 140, such as a local area network (LAN) or a wide area network (WAN). The areas 110a, 110b may each be configured to perform different functions within the content 100 displayed on the display of the handheld device 100. For example, area 110a may comprise the main application content, and area 110b may comprise advertisements and/or other impression content. The advertisement in area 110b may be provided by a third-party advertising partner who has an advertising campaign configured to be presented on the handheld device 100, as part of a software application. The advertising campaign may be configured to enable the impression content 110b to be presented in multiple different types of applications and can be targeted to specific and/or groups of applications based on several different factors. Whilst in the example shown in FIG. 1, area 110a and area 110b are not overlapping, it will be appreciated that in some examples, area 110a and area 110b may overlap.

Furthermore, the main application content 110a may be any type of content, including but not limited to a game or other application. This main application content 110a may be generated on the handheld device 100, or in some examples, may be generated using a server, such as remote server 130, for example running on a cloud-computing platform, such that it is generated in an isolated network segment running on the remote server 130. It will be appreciated that the content 110 presented on a display of the handheld device 110 may also be generated using a server, such as on a cloud-computing platform, and that such remote generation is not limited to main application content 110a, or content presented in only one of, or a select few, of the areas 110a, 110b.

Cloud computing is a model for service delivery enabling on-demand network access to shared resources including processing power, memory, storage, applications, virtual machines, and services, that can be instantiated and released with minimal effort and/or interaction with the provider of the service. Cloud computing environments enable quick and cost-effective expansion and contraction of such resources by enabling the provisioning of computing capabilities, such as server time and network storage as needed. Cloud computing enables the service provider's resources to be pooled and to serve multiple consumers by dynamically assigning and reassigning physical and virtual resources on demand. Examples of such services include Amazon Web Services™ (AWS), Microsoft Azure, and Google Cloud Platform.

Services delivered using a cloud computing environment are often referred to as Software as a Service (SaaS). The applications can be accessed from various user devices through a basic interface, such as a web browser or other software program. A user of the application generally has no control or knowledge over where the provided resources are located or in some examples where multiple service providers are used, or which service provider is providing the resources; access to the resources of the cloud computing environments may be provided via a user account object which facilitates the user's interaction with the resources allocated to a given task within the cloud computing environment. Whilst a cloud computing environment is one of the configurations capable of generating/providing the remotely-rendered content, it will be appreciated that other environments may be used, such as a collection of servers within a LAN.

In some examples, the handheld device 100 may also transmit data back to the remote server 130 indicating receipt of remotely generated content, as well as other data such as viewability information of the content 110, that is whether an area 110a, 110b is visible/viewable by a user of the handheld device 100.

As described above, to facilitate the transmission and/or receiving capabilities, the handheld device 100 may comprise a network adaptor that is arranged to facilitate communication with any number of remote resources, such as the remote server 130, via a network 140 such as a LAN, WAN, and/or a public network (e.g. the Internet). The network adaptor may be configured to communicate using either a wired or wireless communication method, such as cellular connectivity (LTE, 3G, 4G, or 5G), ethernet, or over a Wi-Fi network. It will be appreciated that other types of handheld device 100 and transmitting and/or receiving capabilities may be used.

The handheld device 100 is configured to receive touch-based inputs, such as from one or more fingers of a hand 120 of the user. During use, an area of the display of the handheld device 100, and as such content 110 in the form of a computer-generated scene displayed upon it, may be obscured by the user's hand 120. In some examples, such as when the content 110 comprises impression content, such as an advertisement, it may be desirable to determine how much of the advertisement is actually visible to the user. When the user is interacting with the content 110, such as by providing a touch-based input, an area of the display of the handheld device 100, and as such, an area of the content 110 displayed on the display of the handheld device 100, may be obscured by the user's hand 120. Therefore, in some examples, an area of the content 110 will not be visible to the user.

As mentioned above, in some examples an area, such as area 110b, of the content 110 may comprise impression content, such as an advertisement, and therefore it may be desirable to determine whether the user has successfully viewed the advertisement contained within the area 110b. If they are providing a touch-based input to the handheld device 100, their hand 120 may obscure a proportion of the advertisement shown on the display. This will affect the cost metric associated with the advertisement. Similarly, where important information is displayed within the area 110b, such as safety instruction content, and is partially obscured by the user's hand, it may be desirable to only allow the dismissal of the safety instruction content when it can be determined that a certain proportion of the safety instruction content is or has been visible to the user for a given time period.

In the example shown in FIG. 1, the handheld device 100 is a smartphone configured to display any number of applications which may be downloadable from a remote source, such as an application store. The application provides content 110 in the form of a computer-generated scene for display on the display of the handheld user device. The content 110 comprises a number of areas 110a, 110b. A main application content area 110a is configured to display the main content, such as a game, where a user can provide touch-based inputs. A further area 110b may, as described above, be configured to provide impression content, such as an advertisement, to provide an income stream for the mobile application developer.

When the user is providing a touch-based input to interact with the main application content 110a, their hand 120 may obscure part of the further area 110b, resulting in at least some of the further area 110b not being visible to the user. Determining the proportion of the area of the further area 110b which is obscured is therefore beneficial to determining whether the user of the handheld device 100 actually viewed the content within the further area 110b.

Figure 2:
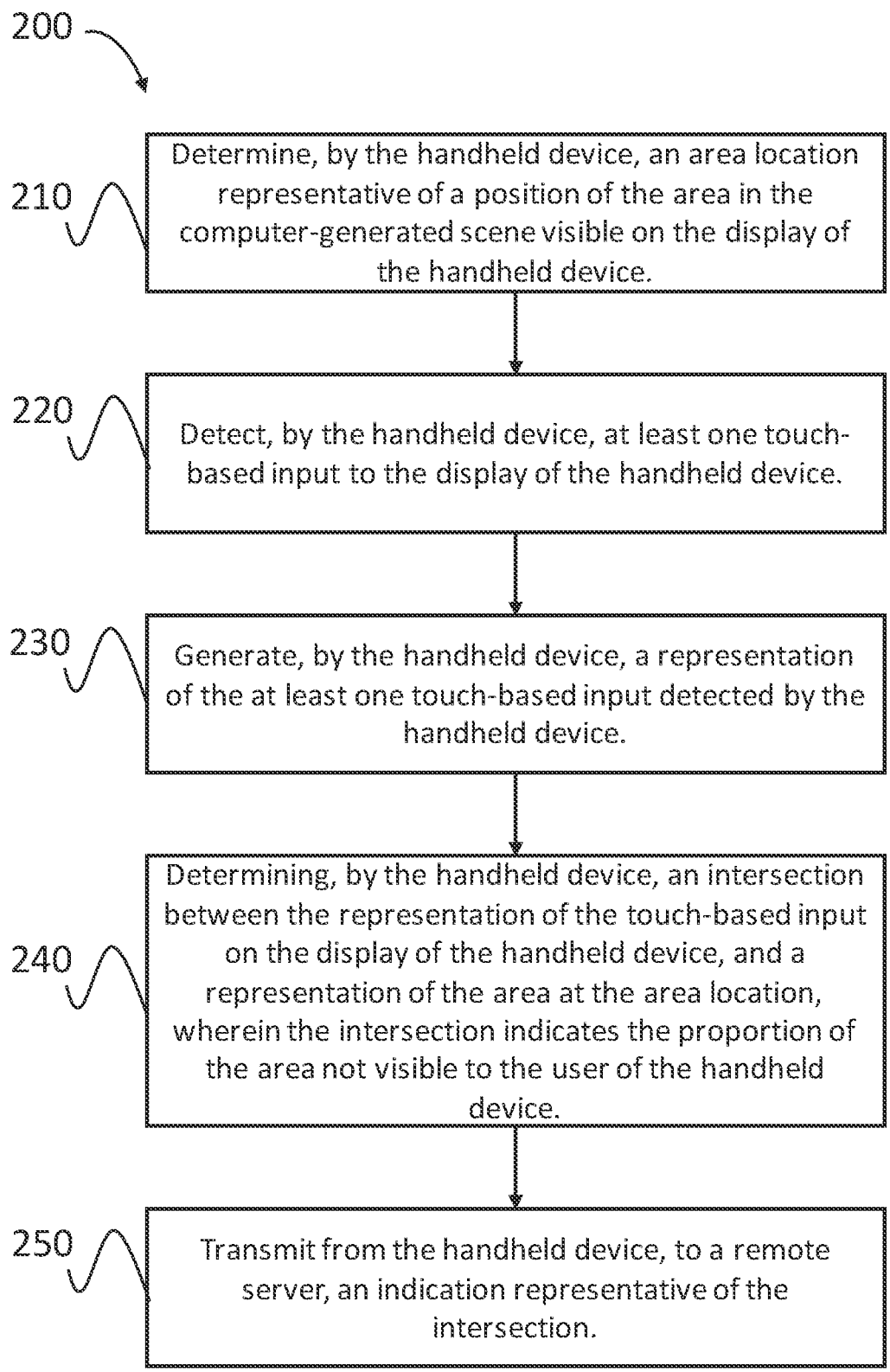
FIG. 2 is a flowchart illustrating a method for determining a proportion of an area in a computer-generated scene visible to a user on a display of a handheld user device, such as the handheld user device shown in FIG. 1, according to an example.

FIG. 2 is a flowchart illustrating a method 200 for determining a proportion of an area, such as area 110b, in a computer-generated scene visible to a user on a display of a handheld device, such as the handheld device 100 shown in FIG. 1. At step 210, the handheld device 100 determines an area location. The area location is representative of a position of area 110b in the computer-generated scene 110 which is visible on the display of the handheld user device 100. The area location may be represented in a number of ways, for example, based on the coordinates of a polygon in the location of area 110b on the display of the handheld device. It will be appreciated that the area location need not be static. In some examples, where area 110b in the computer-generated scene is moving on the display, the size, shape, and/or position of the area location may alter and change.

The area location (also referred to herein as area representation) may be determined using one of many different methods and may involve determining a number of different representations of the area location. Examples of such methods include a point-wise or polygon representation as will be discussed below with reference to FIGS. 3A and 4A.

Once the area location has been determined, at step 220, a touch-based input to the display of the handheld device 100 is detected. It will be appreciated that the touch-based input may be detected using a touchscreen component associated with the display of the handheld device. Hardware external to the handheld device may also be used, for example, a remote camera, or other sensor connected to the handheld device using a wireless or wired connection.

Following the detection of the touch-based input, either from external hardware associated with the handheld device or using a touchscreen component associated with the display of the handheld device 100, at step 230 a representation of at least the touch-based input is generated. The representation of the touch-based input to the display may be a polygon and may comprise pressure intensity information associated with a grid of pressure intensity detection points of a display of the handheld device 100. In other examples, the representation may be an area calculated based on a location of the touch-based input on the display of the handheld device 100. It will be appreciated that other types of representation may be used and that the representation may comprise other data regarding the touch-based input other than just the location and/or size. For example, the representation may comprise temporal data, such as the duration of the touch and/or data associated with the movement of the touch-based input on the display. If the representation does contain other information, such as movement/temporal information, this information can be used to determine other areas that are to be indicated as obscured as will be described later.

At this point both a representation of the touch-based input and an area location representative of the position of area 110b in the computer-generated scene 110 visible on the display of the handheld device 100 have been generated. Using the generated representation and area location, it is possible to determine an intersection between the representation and the area location (step 240). The intersection is indicative of a proportion of area 110b in the computer-generated scene 110 which is not visible to the user of the handheld device 100, for example because their hand 120, or the touch-based input they are providing to the display (e.g., their finger or a stylus), is obscuring that area of the display.

As described briefly above, there are a number of ways in which the representation of the area location and the touch-based input may be depicted. These include the use of polygons and points distributed across area 110b. Each of these will be described in further detail below with reference to FIGS. 3A, and 4A, to describe the methodology for determining an intersection between the touch-based input and the representation of the area location. In some examples, the intersection between the touch-based input and the representation of the area location may be augmented to represent areas which extend beyond the initial touch-based input representation. This may be used to indicate areas where the user's hand 120 extends across area 110b, such that more of the display of the handheld device 100 is obscured, not just that covered by the area of the touch-based input. Determining the proportion of area 110b which is obscured may be calculated in a number of ways based on the methodology used to determine the intersection. It will be appreciated, however, that in some examples, one method may be used to determine the intersection (e.g., a polygon subtraction method), and another, different, method may be used to determine any augmentation. Examples of augmentation methods will also be described in further detail below with reference to FIGS. 3B, 4B, 5.

Once the intersection and any potential augmentation have been determined, the method 200 progresses to step 250, where an indication representative of the intersection, and optionally any augmentation associated therewith, is transmitted to a remote server for further processing. In some examples, where area 110b comprises impression content such as an advertisement, the remote server may collate data associated with the proportion of the impression content visible to the user, and adjust any cost metrics associated with the impression content accordingly. It will be appreciated that other processing may be performed by the remote server, such as the adjustment of the main application content based on the obscured/unobscured areas in the computer-generated scene.

Determining Intersections Using Polygon Subtraction

Figure 3A:
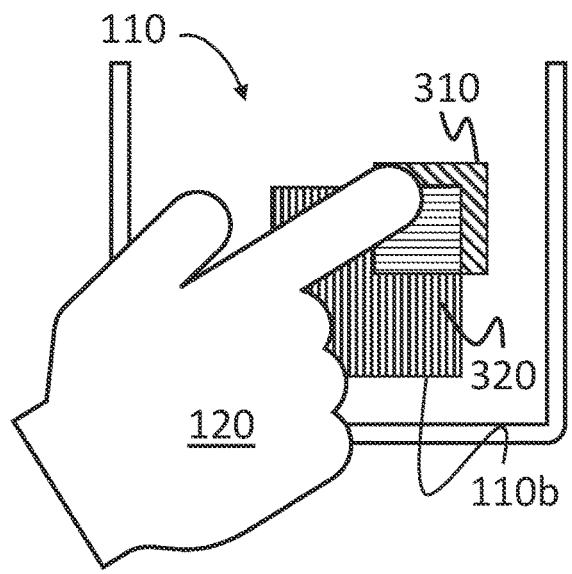
FIG. 3A is a schematic diagram showing the determination of a visible portion of an area in a computer-generated scene, according to a first example, using a polygon indicative of a location of a touch-based input.

FIG. 3A is a schematic diagram showing the determination of a visible area 320 in a computer-generated scene using a polygon 310 indicative of a location of a touch-based input, and a polygon representation of the area 110b in the computer-generated scene 110. Whilst a polygon 310 is used to indicate the location of a touch-based input, throughout this and other examples described, it will be appreciated that other representations of the location of the touch-based input may be used, such as a circle.

The representation of area 110b in the computer-generated scene 110 to be displayed on the display of the handheld device 100 may be positioned at the area location and represented by coordinates within the computer-generated scene 110. Whilst in the example shown in FIG. 3A, area 110b of the computer-generated scene is represented by a quadrilateral, it will be appreciated that other polygons, groups of polygons, point clouds, and other representations of a surface of an object in the computer-generated scene may be used. Furthermore, the location, size, and shape of area 110b may alter over time, and in such examples, the area location representative of area 110b, determined at step 210 of method 200 described above will change also.

The touch-based input in FIG. 3A is represented by a polygon 310 and positioned at the detected location on the display of the handheld device 100. It will be appreciated that the method of determining the position of the touch-based input using the hardware of the handheld device 100 may be dependent on the hardware capabilities of the handheld device 100, permissions associated with a given application being executed by the processor of the handheld device 100, and other capabilities of the handheld device 100. In some examples, as described above, the touch-based input may not be detected by the hardware of the handheld device 100 but may instead be detected using some other method which may involve the use of external hardware. Characteristics of the touch-based input 310 may be exhibited by the polygon representation 310. For example, there may be a single touch-based input as shown in FIG. 3A, represented by a polygon which is indicative of a single finger being detected by a touchscreen display of the handheld device 100. In other examples, multiple inputs of different sizes, and in different locations may be detected such as when a touchscreen display of the handheld device 100 is configured to receive multi-touch inputs.

In one example, a bitmap representation of the touch-based input may be received. This may need to be analyzed and processed so that it can be used to determine the polygonal representation 310 for processing using method 200. The bitmap may be processed to generate the polygonal representation 310 of the touch-based input from the bitmap by applying a marching squares algorithm to the bitmap. Other algorithms for generating a polygonal representation 310 from a bitmap may also be used. In other examples, the touch-based input may be represented in another way. For example, a coordinate location of the received touch-based input on the display of the handheld device 100 may be received, and the polygonal representation 310 is generated around that coordinate location. In other examples, a circle with a given radius centered on the coordinate location may be used.

With both a representation 110b of the area, and a polygon representation 310 of the touch-based input, a difference 320 between the representations can be calculated. The difference 320 may be calculated by subtracting the polygon representation 310 of the touch-based input from the representation 110b of the area. The difference 320 is therefore indicative of the proportion of the area 110b which can be considered to be visible to the user of the handheld device 110. That is, the difference represents an area 320 which is not obscured by at least a part of the user's hand 120 and as such may be visible to the user. In some examples, a ratio of the area 320 considered to be visible to the user can be calculated and then transmitted as part of the indication in step 250 of method 200 to a remote server. This ratio can be used to determine and/or alter any data associated with area 110b, such as a cost metric when area 110b comprises impression content as described above.

Determining Intersections Using Point-Wise Tests

Figure 4A:
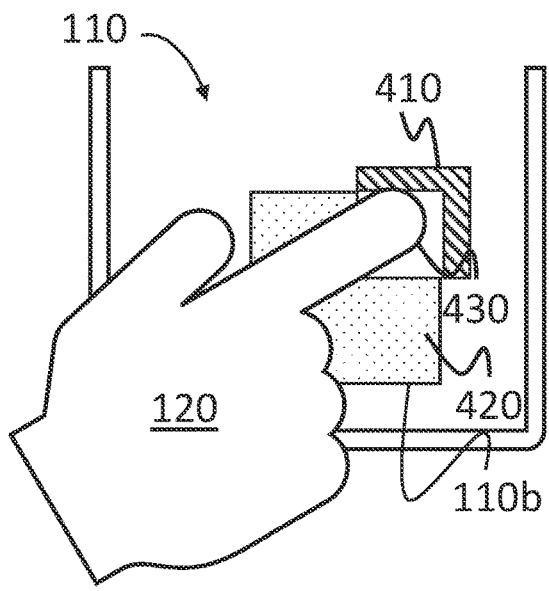
FIG. 4A is a schematic diagram showing the determination of a visible portion of an area in a computer-generated scene, according to a second example, using a number of points distributed across the area location.

FIG. 4A is a schematic diagram showing the determination of a visible portion of area 110b in a computer-generated scene 110.

Area 110b in the computer-generated scene 110 may be represented by a plurality of points generated across the area location representative of area 110b, such that the location of the points matches or approximates area 110b in the computer-generated scene 110. The generation of the points can be performed more quickly and at a lower computational cost than the rendering of the actual content of area 110b, and therefore can be used to quickly and efficiently determine the proportion of area 110b visible to the user. The set of points may also be generated in parallel with the rendering of the content of the area, to reduce any delays being perceived by the user in the loading of the content to be displayed in area 110b. The generated points may be distributed uniformly across the area location representing area 110b, for example on a regular grid, or may be distributed nonuniformly, for example using random sampling, Poisson disk sampling, or an irregular grid for example having periodic offsets between rows or columns. Even if the points are nonuniformly distributed, it may be desirable that the points are distributed substantially evenly across the area location representing area 110b, such that the average density of points does not vary significantly across the area location. The points may also be arranged to extend to the edges of area 110b, or alternatively may extend only partway to the edges of area 110b. The number of generated points can be less than the number of pixels used to represent content presented in area 110b on the display of the handheld device 100. This may result in a relatively low computational cost in comparison with the actual rendering process. However, the number of points should be high enough to give sufficient resolution for the determination of the proportion of area 110b, visible to the user, to be undertaken. The number of points may depend on the dimensions of area 110b, and the points may be arranged on a regular grid with the number of grid lines in each direction being scaled in accordance with a corresponding edge width of area 110b.

As described above, the touch-based input may be represented by a polygon 410 positioned at the detected location on the display of the handheld device 100. Whilst a polygon 410 is used to indicate the location of a touch-based input, throughout this and other examples described, it will be appreciated that other representations of the location of the touch-based input may be used, such as a circle. Furthermore, it will be appreciated that the method of determining the position of the touch-based input using the hardware of the handheld device 100 may be dependent on the hardware capabilities of the handheld device 100 itself, permissions associated with a given application being executed by the processor of the handheld device 100, and other capabilities of the handheld device 100. Characteristics of the touch-based input may be exhibited by the polygon representation 410. For example, there may be a single touch-based input as shown in FIG. 4A, represented by a polygon which is indicative of a single finger being detected by a touchscreen display of the handheld device 100. In other examples, multiple inputs of different sizes, and in different locations may be detected such as when a touchscreen display of the handheld device is configured to receive multi-touch inputs.

In one example, a bitmap representation of the touch-based input may be received. This may then need to be analyzed and processed so that it can be used to determine the polygonal representation 410 for processing using method 200. However, in some examples, such as when generating a plurality of points representative of the area 110b, it will be appreciated that the bitmap itself may be sampled. The bitmap may be processed to generate the polygonal representation 410 of the touch-based input from the bitmap by applying a marching squares algorithm may be to the bitmap. Other algorithms for generating a polygonal representation 410 from a bitmap may also be used. In other examples, the touch-based input may be represented in another way. For example, a coordinate location of the received touch-based input on the display of the handheld device 100 may be received, and the polygonal representation 410 is then generated around that coordinate location. In other examples, a circle with a given radius centered on the coordinate location may be used.

Once the polygonal representation 410 of the touch-based input, and the plurality of points representing the area location of area 110b have been generated, it can be determined how many of the plurality of points are occluded by the polygon representation 410 of the touch-based input, to indicate what proportion 420 of area 110b is visible to the user. It will be appreciated that there are a number of methods for determining this, including testing whether the coordinates of each of the points fall within the polygon representation 410 of the touch-based input. The number of points which are still visible are indicative of the proportion 420 of area 110b which is visible to the user of the handheld device 110, whilst the number of points which are occluded by the polygon representation 410 of the touch-based input is representative of the proportion 430 of area 110b which is not visible to the user of the handheld device 100. That is, the visible points represent visible portions of area 110b which are not obscured by the user's hand 120. In some examples, a ratio of the area visible to the user can be calculated based on the ratio of visible points to occluded points and then transmitted as part of the indication in step 250 of method 200 to a remote server. This ratio can be used to determine and/or alter any data associated with area 110b, such as a cost metric in the case of area 110b comprising impression content as described above.

Augmentation of the Touch-Based Input Representation

When a user interacts with content 110 on a display of a handheld device 100 by providing a touch-based input, their hand 120 often extends across the display of the handheld device 100, thereby obscuring more of the content 110 than just the content in and around the location of the touch-based input. Therefore, in some examples, it is desirable to augment the representation 310, 410 of the touch-based input to more accurately represent the proportion of area 110b which is visible to the user of the handheld device 100.

There are a number of methods for augmenting the representation 310, 410 of the touch-based input, and the method used may be linked to the method of determining the intersection between the representation 310, 410 of touch-based input, and the representation of the area location indicative of area 110b. Alternatively the methods used may be different, such that one method is used to determine the intersection, whilst another method is used to augment the representation 310, 410 of the touch-based input.

Figure 3B:
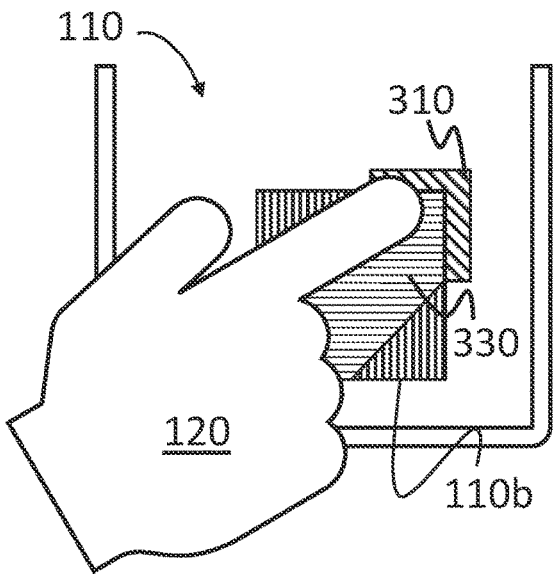
FIG. 3B is a schematic diagram showing the augmentation of the polygon indicative of a location of a touch-based input, according to the first example shown in FIG. 3A.
Figure 4B:
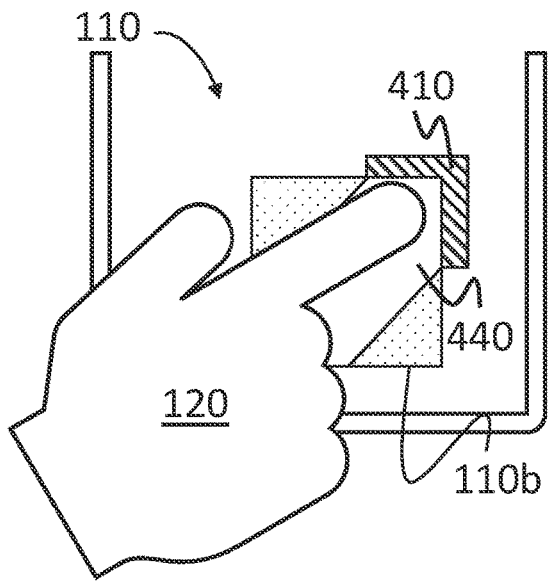
FIG. 4B is a schematic diagram showing the augmentation of a representation of a touch-based input, according to the second example shown in FIG. 4A.

FIG. 3B and FIG. 4B are schematic diagrams showing the augmentation of the representation 310, 410 of a touch-based input which may have been determined for use by one of the intersection test methodologies described above with reference to FIGS. 3A and 4A. In such examples, characteristics of the polygon representation 310, 410 of the touch-based input may be altered. For example, the position, size, and shape of the polygon representation 310, 410 may be adjusted to produce an augmented polygon representation 330, 440 which is subsequently used for the intersection test described above with reference to FIG. 3A and FIG. 4B, and to provide the indication of the proportion of area 110b visible to the user. In some examples, the position, size and shape of the polygon representation 310, 410 may be adjusted by combining multiple polygon representations (e.g., polygons representing multiple touch-based inputs), and/or by stretching the polygon representation 310, 410.

Determining how to augment the representation 310, 410 of the touch-based input may be undertaken in a number of ways. As mentioned above, the determination of the location of the touch-based input, and the subsequent generation of the representation 310, 410 may be based on a sampling the outputs of a grid of pressure intensity detection points associated with the display of the handheld device 100. To determine how to augment the representation 310, 410 of the touch-based input, the sample of the outputs of the grid of pressure intensity detection points may be analyzed, and a filter, such as a zoom blur, may be applied. By applying a filter characteristics associated with the touch-based input can be determined and the representation 310, 410 can be augmented so as to represent the directionality of the touch-based input, thereby providing a more accurate, augmented, representation 330, 440 of the touch-based input. This results in a more accurate determination of the indication of the proportion of the area 110b visible to the user.

In addition to, or instead of, obtaining pressure data from pressure intensity detection points associated with the display of the handheld device 100, other characteristics may be used to determine how to augment the representation 310, 410 of the touch-based input. These include gathering data from one or more sensors associated with the handheld device 100, in order to detect the position of a user's hand with respect to the handheld device 100 when cradling or otherwise holding the device. Such sensors include, but are not limited to an accelerometer, gyroscope, or geolocation sensor. Furthermore, data associated with the content 110 comprising the computer-generated scene being displayed on the display of the handheld device may be obtained such as the orientation of the content being displayed. Similarly, if more than one touch-based input is detected, the relative locations of each of the touch-based inputs may be used to determine how to augment the representation 310, 410.

Generating the augmented representation 330, 440 of the touch-based input based on the characteristics of the touch-based input, including any subsequent processing such as the application of a zoom blur filter, may result in an extruded polygon based on the representation 310, 410 of the touch-based input. The extruded polygon may be adjusted and altered to provide the augmented representation 330, 440 indicative of the proportion of area 110b which is occluded by the user's hand or a digit of the user's hand 120. It will be appreciated that extruding the polygon to provide the augmented representation 330, 440 may be undertaken in any number of ways, including the generation of quadrilaterals associated with the location of the touch-based input. The vertices of the polygons may be adjusted such that the ones furthest from the location of the touch-based input are moved further away from the location of the touch-based input. It will be appreciated that, in some examples, the vertices of the polygons may be adjusted such that ones furthest from the location of another reference point on the display of the handheld device 100 may be moved. The polygons generated from these quadrilaterals may be duplicated and modified, such as by increasing or decreasing their size, and altering their position, and then combined with other polygons to provide the augmented representation 330, 440 indicative of the proportion of area 110b which is not visible to the user.

Figure 5:
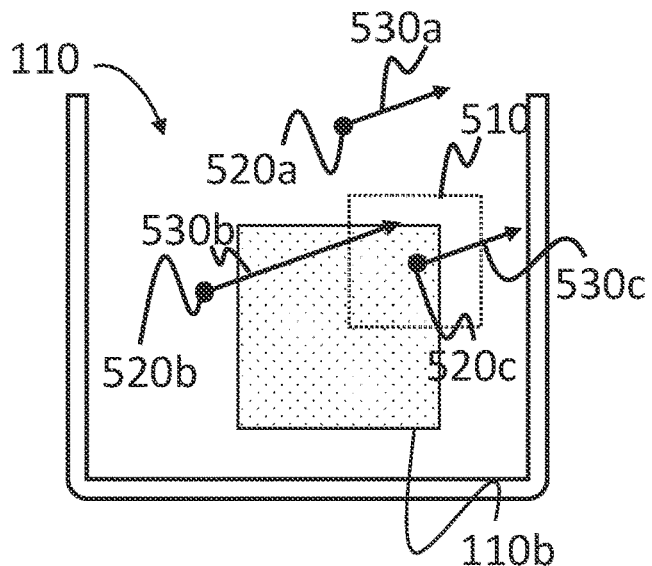
FIG. 5 is a schematic diagram showing the determination of a visible portion of an area in a computer-generated scene, using a plurality of line segments associated with a number of points distributed across the area location.

Other methods of determining the augmented representation 330, 440 may also be used. For example, as shown in FIG. 5, a plurality of points 520*a*, 520*b*, 520*c* may be generated to represent at least part of the computer-generated scene 110. For example, the points may be distributed substantially evenly across area 110*b*, as described above with reference to FIG. 4A. The plurality of points may be distributed across the entirety of the computer-generated scene 110, or in some examples may, as in the example described above in FIG. 4A be distributed across area 110*b* or another area of the computer-generated scene where it is desirable to determine the proportion of which is visible to the user.

Each of the plurality of points 520*a*, 520*b*, 520*c* may have an associated line segment 530*a*, 530*b*, 530*c*, the direction and magnitude of which may be determined using any number of methods, such as previous touch-input calibration data as described below, and other characteristics of the handheld device and/or computer-generated scene. Whilst FIG. 5 only shows three points 520*a*, 520*b*, 520*c* and their associated line segments 530*a*, 530*b*, 530*c*, it will be appreciated that any number of points and associated line segments may be determined, and those points may be representative of both the main content area 110*a* and the impression content area 110*b*. The representation 510 of the touch-based input is then determined and it is calculated as to whether each of the line segments 520*a*, 520*b*, 520*c* intersects with the representation 510 of the touch-based input. As is shown in FIG. 5, two of the line segments 530*b*, 530*c* associated with points 520*b*, 520*c* intersect with the representation of the touch-based in input. This intersection may then be used to determine an occluded portion of area 110*b* as described above with reference to FIGS. 3B and 4B.

The augmented representation 330, 440 may be generated using any number of geometrical constructs, such as the joining of polygons associated with each of points 520*a*, 520*b*, 520*c* which are determined to intersect with the representation of the touch-based input 510, or the generation of capsule shapes representative of a digit of the user's hand.

In addition to characteristics gathered from hardware associated with the device, other information, such as touch-input calibration data, may also be used when determining how to augment the touch-based input. The touch-input calibration may comprise data obtained from previous user interactions with a handheld device, such as handheld device 100, such as touch-input location and areas of the display known to be obscured by the user's hand 120. Once obtained, the touch-input calibration data may be analyzed and used to determine an augmentation area, such that the representation 310, 410, 510 of the touch-based input can be augmented based on the augmentation area determined. Touch-input calibration data may be obtained from storage, either on the handheld device 100 itself or stored remotely, such as in the remote server 130 described above with reference to FIG. 1.

The touch-input calibration data may comprise touch-based input locations obtained from a user interaction with a touchscreen display, along with data obtained from an external source and/or sensor. For example, the touch-input calibration data may comprise the touch-based input coordinate data obtained by the touchscreen controller of the display of the handheld device 100, alongside video data captured of a user interacting with the touchscreen display of the handheld device 100. The video data may comprise a plurality of frames of image data representative of the viewpoint of the user interacting with the display. In some examples, the video data may be analyzed using a trained machine learning algorithm configured to detect areas of the screen obscured by the user's hand and associate them with the touch-based input data received by the touchscreen.

When analyzing the touch-input calibration data, specifically any video and/or image data, a number of factors may be considered, including color data and blurring between the individual frames of image data. This aids in avoiding erroneous detection from frames where the background is too similar to the user's hand as it moves across the display. For example, analysis may be performed on frames of image data with a given time difference such that only those frames of image data where the change is significant are analyzed. As part of the detection of the user's hand in the frames of image data, touch positions and augmentation area may be calculated using shadows detected in the frames of image data surrounding the location of the user's hand in the frames of image data. The outline of the user's hand may then be generated as a bitmap and saved. The outline data may then be further processed, such as being used to train a machine learning algorithm which in turn may be used to determine the proportion of area 110*b* in a computer-generated scene 110 which is visible to a user for a given touch-based input as described above with reference to method 200.

Hardware of the Handheld Device

Figure 6:
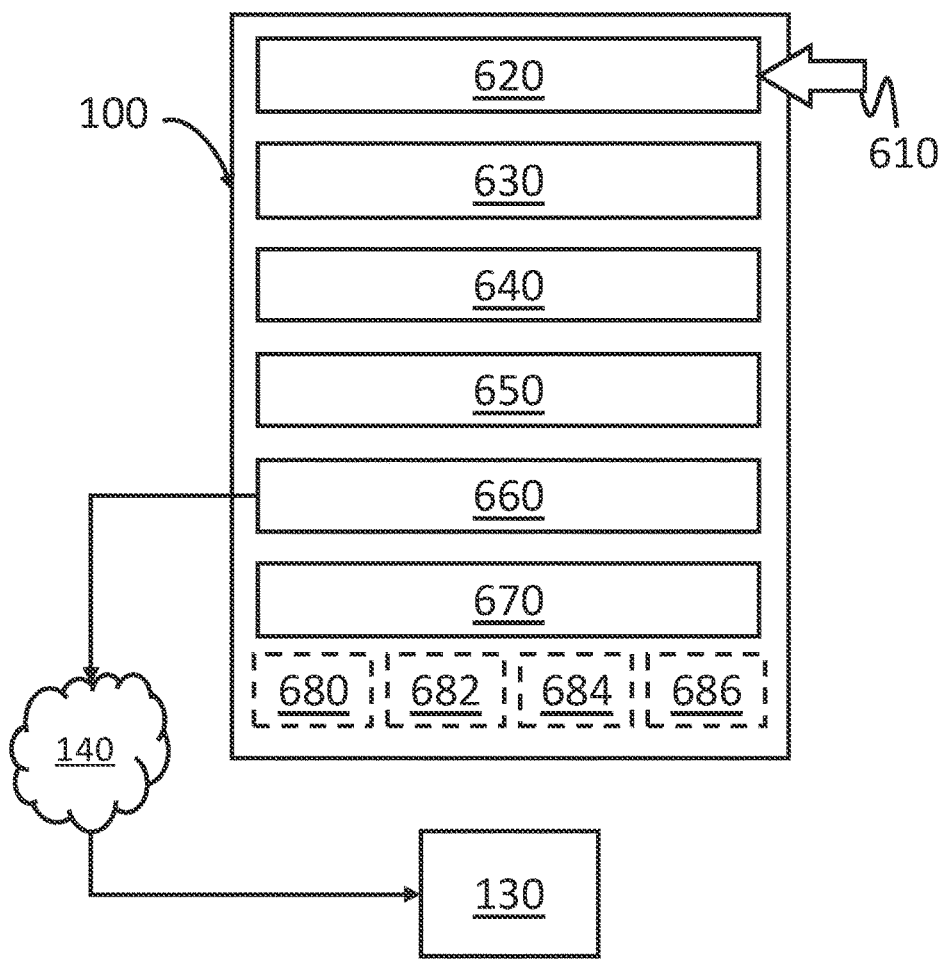
FIG. 6 is a schematic representation of a handheld device configured to determine an area of a computer-generated scene visible to a user of the handheld device.

FIG. 6 is a schematic representation of a handheld device, such as handheld device 100 described above with reference to FIG. 1. The handheld device 100 is configured to determine a visible proportion of area 110*b* of a computer-generated scene 110 based on a touch-based input 610 received at the handheld device 100. The handheld device 100 comprises a display 620 for displaying at least a part of a computer-generated scene 110. The computer-generated scene 110 may be generated on the handheld device 110 itself, such as by a processor (not shown) and/or graphics processing unit (not shown), or may be generated remotely, such as at a remote server 130. The display 620 is configured to receive a touch-based input 610, from the user. The touch-based input 610 may be detected and its location determined using a touch module 630, such as a touch screen controller, associated with the display 620 of the handheld device 100. It will be appreciated that in some examples, hardware external to the handheld device 100 may also be used to detect the touch-based input 610, for example, a remote camera, or other sensor connected to the handheld device 100 using a wireless or wired connection.

A determination module 640 is configured to analyze the computer-generated scene 110 and determine an area location representative of a position of area 110*b* in the computer-generated scene 110 which is visible on the display of the handheld device 100. In some examples, the area 110*b* may be partially visible, and or partially obscured, such as at least part of the area 110*b* being represented outside the display area of the display of the handheld device 100. The area location is representative of the portion on the display of area 110*b* for use in determining the proportion is visible to a user. The area location may be represented in a number of ways, for example, based on the coordinates of a polygon in the location of area 110*b* on the display 620 of the handheld device 100. Further, it will be appreciated that the area location need not be static. In some examples, where the area in the computer-generated scene 110 is moving on the display 620, the size, shape, and/or position of the representation may alter and change.

The area representation may be determined using many different methods, as will be appreciated by the skilled person, and may comprise a number of different representations of the area location. Examples of such methods include point-wise or polygon representations described above with reference to FIGS. 3A and 4A.

The handheld device 100 also comprises a generation module 650 configured to generate a representation of at least the touch-based input. The representation of the touch-based input to the display 620 may be a polygon and may comprise pressure intensity information associated with a grid of pressure intensity detection points of a display of the handheld device 100. In other examples, the representation may be an area calculated based on a location of the touch-based input on the display of the handheld device 100. It will be appreciated that other types of representation may be used, and that the representation may comprise other data regarding the touch-based input 610 other than just the location and/or size. For example, the representation may comprise temporal data, such as the duration of the touch and/or data associated with the movement of the touch-based input on the display.

With both a representation of the touch-based input and an area location representative of the position of area 110b in the computer-generated scene 110 visible on the display of the handheld device 100 an intersection determination module 660 may be used to determine an intersection between the representation and the area location. The intersection is indicative of a proportion of area 110b in the computer-generated scene 110 which is not visible to the user of the handheld device 100, namely because of their hand, or the touch-based input 610 they are providing to the display (e.g., their finger or a stylus) is obscuring that area of the display 620.

As described above with reference to FIGS. 3A, and 4A, there are a number of ways in which the representation of the area location and the touch-based input may be depicted. These include the use of polygons and points distributed across the area 110b. As described above with reference to FIGS. 3B, 4B, and 5, in some examples, the intersection between the touch-based input 610 and the representation of the area location may be augmented to represent areas which extend beyond the initial touch-based input representation 310, 410, 510. This may be used to indicate areas where the user's hand extends across area 110b, such that a larger proportion of area 110b is obscured, not just those covered by the area of the touch-based input. Determining the proportion of area 110b which is obscured may be calculated in a number of ways based on the methodology used to determine the intersection. It will be appreciated, however, that in some examples, one method may be used to determine the intersection (e.g., a polygon subtraction method), and another, different, method may be used to determine any augmentation.

The indication representative of the intersection generated by the intersection determination module 660, and optionally any augmentation associated therewith, is transmitted by a transmission module 670 to a remote server 130 for further processing. In some examples, where area 110b obscured by the touch-based input 610 comprises impression content such as an advertisement, the remote server 130 may collate data associated with the proportion of the impression content viewable by a user, and adjust any cost metrics associated with the impression content accordingly. It will be appreciated that other processing may be performed by the remote server 130, such as the adjustment of the main application content 110a based on the obscured/unobscured areas in the computer-generated scene 110. The transmission module 670 may comprise a network adaptor that is arranged to facilitate communication with any number of remote resources, such as the remote server 130, via a network 140 such as a LAN, WAN, and/or a public network (e.g. the Internet). The network adaptor may be configured to communicate using either a wired or wireless communication method, such as cellular connectivity (LTE, 3G, 4G, or 5G), ethernet, or over a Wi-Fi network. It will be appreciated that other types of transmitting and/or receiving capabilities may be used.

The handheld device 100 may also comprise one or more sensors 680 such as an accelerometer, gyroscope, or geolocation sensor. The sensor data obtained from the one or more sensors 680 Furthermore, the handheld device may comprise a characteristic analysis module 682 configured to obtain and analyze data associated with the computer-generated scene being displayed on the display 620 of the handheld device 110. The characteristic analysis module may obtain data such as the orientation of the content being displayed alongside other characteristics such as a size of the content to be displayed, and other hardware requirements.

The use of additional data captured from the one or more sensors 680 and/or the characteristic analysis module 682 enables additional inputs to be used when determining the representation of the touch-based input, or when augmenting the touch-based, thereby increasing the accuracy of the augmentation.

Storage 684 associated with the handheld device 100 may be configured to store touch-input calibration data. In some examples, the storage 680 may not form part of the handheld device 100 itself, but may instead be part of a remote server, such as remote server 130, communicably coupled to the handheld device. The storage 684 may be a solid-state drive (SSD) or other semiconductor-based RAM; a ROM, for example, a CD ROM or a semiconductor ROM; a magnetic recording medium, for example, a floppy disk or hard disk; optical memory devices in general. The touch-input calibration may comprise data obtained from previous user interactions with a handheld device, such as handheld device 100, such as touch-input location and areas of the display known to be obscured by the user's hand. Once obtained, the touch-input calibration data may be analyzed and used to determine an augmentation area, such that the representation of the touch-based input 610 can be augmented based on the augmentation area determined.

The touch-input calibration data may comprise touch-based input locations obtained from a user's previous interaction with a touchscreen display 620, along with data obtained from an external source and/or sensor 680. For example, the touch-input calibration data may comprise the touch-based input coordinate data obtained by the touch module 630 of the display 620 of the handheld device 100, alongside video data captured of a user interacting with the touchscreen display 620 of the handheld device 100. The video data may comprise a plurality of frames of image data representative of the viewpoint of the user interacting with the display. In some examples, the video data may be analyzed using a trained machine learning algorithm configured to detect areas of the screen obscured by the user's hand and associate them with the touch-based input data received by the touchscreen.

The handheld device 100 may also comprise an augmentation module 686. The augmentation module 686 is configured to augment the representation of the touch-based input as described above with reference to FIGS. 3B, 4B, and 5. The augmentation module 686 may be configured to obtain the touch-input calibration data from the storage 684 and analyze the touch-input calibration data to determine an augmentation area. This may comprise using a trained machine learning algorithm configured to be executed by a machine learning processor (not shown) which may be associated with the augmentation module 686 itself or form part of a more general-purpose processor (not shown) of the handheld device 100.

At least some aspects of the examples described herein, with reference to FIGS. 1-6, comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above examples are to be understood as illustrative examples of the disclosure. Further examples of the disclosure are envisaged. It is to be understood that any feature described in relation to any one example may be used alone, or in combination with other features described, and may also be used in combination with one or more features of any other of the example, or any combination of any other of the examples. Furthermore, equivalents and modifications not described above may also be employed without departing from the scope of the disclosure, which is defined in the accompanying claims.

What is claimed is:

1. A method for determining a proportion of at least one area of impression content within a computer-generated scene that is visible to a user on a display of a handheld device, the handheld device being configured to receive touch-based inputs, method comprising:
   determining, by the handheld device, an area location representative of a position of the at least one area of impression content within the computer-generated scene visible on the display of the handheld device;
   detecting, by the handheld device, at least one touch-based input to the display of the handheld device;
   generating, by the handheld device, a representation of the at least one touch-based input detected by the handheld device;
   determining, by the handheld device, an intersection between the representation of the at least one touch-based input on the display of the handheld device, and a representation of the at least one area of impression content at the area location, wherein the intersection indicates the proportion of the at least one area of impression content not visible to the user on the display of the handheld device;
   transmitting, from the handheld device to a remote server, an indication comprising data representative of the intersection for use in adjusting, by the remote server, at least the computer-generated scene to produce an adjusted computer-generated scene comprising the impression content;
   receiving, at the handheld device and from the remote server, the adjusted computer-generated scene; and
   displaying, on the display of the handheld device, the adjusted computer-generated scene.

2. The method according to claim 1, comprising:
   generating, by the handheld device, at least one polygon indicative of the representation of the at least one touch-based input; and
   determining, by the handheld device, a difference between the at least one polygon and a polygon indicative of the representation of the area of impression content rendered at the given area location;
   wherein the determined difference indicates the proportion of the area of impression content visible to the user of the handheld device.

3. The method according to claim 2, wherein generating the at least one polygon indicative of the representation of the at least one touch-based input comprises applying at least a marching squares algorithm to the representation of the touch-based input.

4. The method according to claim 2, wherein the at least one polygon indicative of the representation of the at least one touch-based input is augmented by modifying at least one of a size or a position of the at least one polygon, the modification being based on the at least one touch-based input on the display of the handheld device.

5. The method according to claim 1, wherein the step of determining the intersection between the representation of the at least one touch-based input on the display of the handheld device, and the representation of the at least one area of impression content at the area location comprises:
   generating a given number of points distributed substantially evenly across the representation of the at least one area of impression content;
   determining whether one or more of the given number of points is occluded by the representation of the at least one touch-based input; and
   calculating the proportion of the area of impression content that is visible to the user based on a ratio of un-occluded points and the given number of points.

6. The method according to claim 5, wherein the representation of the at least one touch-based input is augmented based on a plurality of touch points associated with the representation of the at least one touch-based input.

7. The method according to claim 5, wherein augmenting the representation of the touch-based input comprises determining one or more line segments associated with one or more points on the display of the handheld device and each of a plurality of test points, and determining an intersection between the one or more line segments and the representation of the location of the touch-based input.

8. The method according to claim 1, wherein the representation of the touch-based input comprises at least one of:
   a sampled representation of a touch location based on sampling a grid of pressure intensity detection points associated with the display of the handheld device; and
   an area calculated based on a location of the at least one touch-based input detected by the handheld device.

9. The method according to claim 8, further comprising augmenting the representation of the at least one touch-based input by applying a zoom blur to the sampled representation.

10. The method according to claim 1, wherein the representation of the at least one touch-based input is augmented based on the at least one characteristic of the handheld device, the at least one characteristic comprising at least one of:
- sensor data associated with a sensor of the handheld device;
- data associated with at least one other touch-based input detected by the handheld device;
- a feature associated with the computer-generated scene being displayed on the display of the handheld device; and
- touch input calibration data.

11. The method according to claim 10, wherein augmenting the representation of the at least one touch-based input comprises:
- obtaining touch input calibration data from storage associated with the handheld device;
- analyzing the touch input calibration data to determine an augmentation area; and
- augmenting the representation of the at least one touch-based input based on the augmentation area.

12. The method according to claim 11, wherein the touch input calibration data comprises a plurality of sampled representations representing a plurality of touch-based inputs by at least one previous user of a given handheld device, wherein the plurality of touch-based inputs are associated with a given location of a given touch-based input.

13. The method according to claim 11, wherein the touch input calibration data comprises data derived from touch-based input data based on interaction by at least one previous user of a given handheld device and associated frames of image data representing a viewpoint of the previous user.

14. The method according to claim 11, wherein the touch input calibration data is determined using a machine learning algorithm arranged to receive at least a plurality of the touch-based input data.

15. A handheld device comprising:
- a display for displaying at least a computer-generated scene, and receiving at least one touch-based input;
- a determination module for determining an area location representative of a position of at least one area of impression content within the computer-generated scene visible on the display;
- a touch module for detecting at least one touch-based input;
- a generation module for generating at least a representation of the at least one touch-based input detected by the handheld device;
- an intersection determination module for determining an intersection between the representation of the at least one touch-based input on the display of the handheld device, and a representation of the at least one area of impression content at the area location, wherein the intersection indicates the proportion of the at least one area of impression content not visible to a user on the display;
- a transmission module for transmitting an indication, comprising data representative of the intersection, to a remote server, wherein the data representative of the intersection is used to adjust, by the remote server, at least the computer-generated scene to produce an adjusted computer-generated scene comprising the impression content; and
- an input module for receiving, from the remote server, at least the adjusted computer-generated scene, wherein the display is configured to display at least the adjusted computer-generated scene.

16. The handheld device according to claim 15, further comprising:
- at least one sensor for capturing data associated with at least one environmental factor;
- a characteristic analysis module configured to generate characteristics associated with the computer-generated scene being displayed on the display of the handheld device; and
- storage configured to store at least touch input calibration data.

17. The handheld device according to claim 15, further comprising an augmentation module configured to augment the representation of the at least one touch-based input.

18. The handheld device according to claim 17, wherein the augmentation module is further configured to:
- obtain touch input calibration data from storage associated with the handheld device; and
- analyze the touch input calibration data to determine an augmentation area; and
- augment the representation of the touch-based input based on the augmentation area.

19. The handheld device according to claim 17, wherein the augmentation module comprises a machine learning processor for generating augmentation data using a trained machine learning algorithm arranged to receive at least the touch-based input, and the touch input calibration data.

20. A non-transitory computer-readable storage medium comprising a set of computer-readable instructions stored thereon which, when executed by at least one processor are arranged to determine a proportion of at least one area of impression content within a computer-generated scene that is visible to a user on a display of a handheld device configured to receive touch-based inputs, wherein the instructions, when executed cause the at least one processor to:
- determine, an area location representative of a position of the area of impression content within the computer-generated scene visible on the display of the handheld device;
- detect at least one touch-based input to the display of the handheld device;
- generate a representation of the at least one touch-based input detected by the handheld device;
- determine an intersection between a representation of the touch-based input on the display of the handheld device, and a representation of the area of impression content at the area location, wherein the intersection indicates the proportion of the area of impression content not visible to the user on the display of the handheld device;
- transmitting, from the handheld device to a remote server, an indication comprising data representative of the intersection for use in adjusting, by the remote server, at least the computer-generated scene to produce an adjusted computer-generated scene comprising the impression content; and
- receiving, at the handheld device and from the remote server, the adjusted computer-generated scene; and
- displaying, on the display of the handheld device, the adjusted computer-generated scene.

* * * * *